G. W. JOHNSON.
AUXILIARY CHAIN FASTENER.
APPLICATION FILED DEC. 6, 1921.
1,424,569.
Patented Aug. 1, 1922.
Fig. 1.
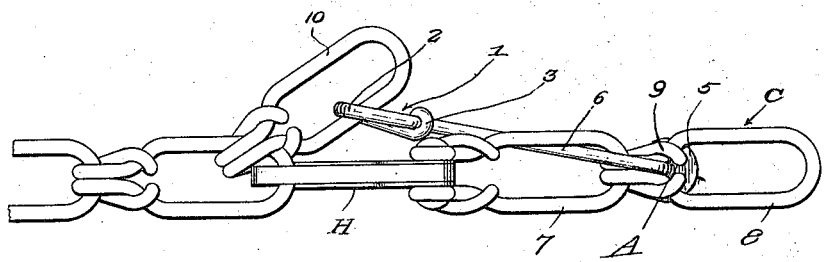
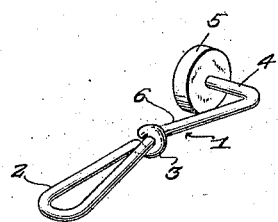
Fig. 2.
G. W. Johnson, INVENTOR.
BY Geo. F. Kimmel, ATTORNEY.

UNITED STATES PATENT OFFICE.

GEORGE W. JOHNSON, OF GALLATIN, MISSOURI.

AUXILIARY CHAIN FASTENER.

1,424,569.

Specification of Letters Patent. Patented Aug. 1, 1922.

Application filed December 6, 1921. Serial No. 520,244.

*To all whom it may concern:*

Be it known that I, GEORGE W. JOHNSON, a citizen of the United States, residing at Gallatin, in the county of Daviess and State of Missouri, have invented certain new and useful Improvements in Auxiliary Chain Fasteners, of which the following is a specification.

This invention relates to fasteners and more particularly to auxiliary fasteners for the loose ends of automobile tire chains.

The object of the invention is to provide a simply constructed, cheap, durable device of this character, which will operate not only to prevent the loose ends of tire chains from flapping against the fenders, but also as auxiliary securing means for the chain to avoid loss of the chain in case the regular fastening fails to hold.

With these and other objects in view, the invention consists in certain novel features of construction as hereinafter shown, described and claimed.

In the accompanying drawings:—

Figure 1 represents a side elevation of a portion of a tire chain with the connector constituting this invention shown applied, and, Fig. 2 is a detail perspective view of the connector detached.

In the embodiment illustrated, the meeting ends of the tire chain C are shown connected by the usual snap fastener H and having a loose end as shown at 10. In order to connect this loose end 10 and prevent its flapping against the fenders and other parts of the car, the connector 1 constituting this invention is designed and is adapted to engage said end 10 and connect it with the chain C at a point to hold the end 10 taut.

The connector 1 is composed of a piece of heavy wire bent to form a loop 2 at one end, the terminal of which is extended laterally and bent into a hook 3 to engage the shank of the connector preferably at a point midway its ends as is shown clearly in Fig. 2. The other end of the wire is bent laterally at right angles to form an arm 4 which carries at its free end a knob-like terminal in the form of a button 5. This knob or button 5 is here shown in the form of a disk and is greater in diameter than the distance between the side members of the chain links in connection with which the device is to be used so that when said knob is inserted through one of said links as shown in Fig. 1, danger of its accidentally slipping out will be avoided.

In the use of this connector 1, the loop 2 thereof is engaged with the loose end 10 of the tire chain and permanently secured thereto, so that when the chain is applied and fastened by the ordinary fastener H, the loose end 10 which will be left unattached may be connected by the connector 1 with one of the chain links by inserting the knob-like button 5 through the links as is shown clearly in Fig. 1. To attach the device, it is obvious that this button-like member 5 must be inserted first through link 7 from one side and then through link 8 from the opposite side and when so inserted the shank 6 of the fastener is entered between the furcations 9 at the end of link 8 with the inner face of the button 5 bearing against the outer face of the link 8 and holding the device in engaged position, against all danger of its slipping through the link.

While this connector 1 is intended primarily as a fastener for the loose end of an anti-skid chain, obviously, it may be used for connecting the ends of other chains or other articles having a loop at one end for insertion of the fastening button 5. The right angular arm 4 provides sufficient space between the shank 6 and the button 5 for the insertion of the link of the chain with which the device is connected and adapted to operate in the manner of a hook for engagement with the chain.

From the above description, it will be obvious that this connector will be permanently mounted on one end of an anti-skid chain and may be quickly connected with cooperating links as shown in Fig. 1, and will operate not only to hold the loose end of the chain but to secure the ends of the chain together in case the regular fastener H slips or becomes broken in any way.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. A connector of the class described comprising a piece of heavy wire having one end bent to form a loop and the terminal thereof extended laterally and wrapped around the body portion of the wire, the other end of said wire being bent angularly at right angles and provided at its terminal with a knob.

2. The combination with an anti-skid chain having a fastener for connecting the ends thereof; of an auxiliary fastener for the loose end of the chain having a loop for engagement with said loose end, and a laterally offset knob at its other end for engagement with one of the links of the chain.

In testimony whereof, I affix my signature hereto.

GEORGE W. JOHNSON.